US011271759B2

(12) United States Patent
Cambou

(10) Patent No.: US 11,271,759 B2
(45) Date of Patent: Mar. 8, 2022

(54) SECURE DIGITAL SIGNATURES USING PHYSICAL UNCLONABLE FUNCTION DEVICES WITH REDUCED ERROR RATES

(71) Applicant: Arizona Board of Regents on Behalf of Northern Arizona University, Flagstaff, AZ (US)

(72) Inventor: Bertrand F Cambou, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 161 days.

(21) Appl. No.: 16/560,502

(22) Filed: Sep. 4, 2019

(65) Prior Publication Data
US 2020/0076624 A1 Mar. 5, 2020

Related U.S. Application Data

(60) Provisional application No. 62/727,186, filed on Sep. 5, 2018.

(51) Int. Cl.
*H04L 9/32* (2006.01)
*H04L 9/08* (2006.01)
(Continued)

(52) U.S. Cl.
CPC .......... *H04L 9/3278* (2013.01); *H04L 9/0643* (2013.01); *H04L 9/0844* (2013.01);
(Continued)

(58) Field of Classification Search
CPC ....... H04L 9/3278; H04L 9/0643; H04L 9/12; H04L 2209/38; H04L 9/0861; H04L 9/3239; G06F 7/588
(Continued)

(56) References Cited

U.S. PATENT DOCUMENTS 8,667,265 B1 * 3/2014 Hamlet ................. H04L 9/0866
713/150
8,848,905 B1 * 9/2014 Hamlet ................. H04L 9/0866
380/35
(Continued)

FOREIGN PATENT DOCUMENTS

WO        201818366 A1    10/2018

OTHER PUBLICATIONS

Afghah et al., "A ReRAM Physically Unclonable Function (ReRAM PUF)-based Approach to Enhance Authentication Security in Software Defined Wireless Networks", Cornell University, Dec. 21, 2017, 16 pages, submitted to Springer International Journal of Wireless Information Networks, arXiv:1712.09916 [cs.CR].
(Continued)

*Primary Examiner* — Dereena T Cattungal
(74) *Attorney, Agent, or Firm* — Quarles & Brady LLP

(57) ABSTRACT

Systems and methods for securing blockchain and other cryptographically signed ledgers are disclosed. Client devices with arrays of physical-unclonable-function devices are respond to challenges from a server. Characteristics of the arrays are stored by the server during a secure enrollment process. Subsequently, the server issues challenges to the clients and receives responses generated by the clients from characteristics of portions of the arrays specified by the challenges. The challenge responses are used to authenticate the clients and are also used as cryptographic private keys for signing transaction blocks. Public keys corresponding to the private keys are generated allowing signed transaction blocks to be validated as well as allowing clients originating the transactions to be authenticated by other clients. Ternary PUF characterization schemes are used to achieve acceptable authentication error rates.

20 Claims, 8 Drawing Sheets

(51) Int. Cl.
*H04L 9/06* (2006.01)
*H04L 9/12* (2006.01)
*G06F 7/58* (2006.01)

(52) U.S. Cl.
CPC ............... *G06F 7/588* (2013.01); *H04L 9/12* (2013.01); *H04L 2209/38* (2013.01)

(58) Field of Classification Search
USPC ......................................................... 713/171
See application file for complete search history.

(56) References Cited

U.S. PATENT DOCUMENTS

| | | | | |
|---|---|---|---|---|
| 10,256,983 B1* | 4/2019 | Bauer | .................... | H04L 9/3278 |
| 10,574,468 B2* | 2/2020 | Kim | ....................... | H01L 23/528 |
| 10,855,478 B2* | 12/2020 | Lu | .......................... | H04L 9/3278 |
| 10,868,669 B2* | 12/2020 | Liu | ....................... | H04L 63/0442 |
| 2013/0010957 A1* | 1/2013 | Yu | .......................... | H04L 9/0844 |
| | | | | 380/260 |
| 2015/0341792 A1* | 11/2015 | Walsh | .................... | H04L 9/0866 |
| | | | | 713/171 |
| 2017/0063559 A1* | 3/2017 | Wallrabenstein | ..... | H04L 9/3026 |
| 2017/0310489 A1* | 10/2017 | Van Der Sluis | .......... | H04L 9/30 |
| 2018/0351754 A1* | 12/2018 | Wallrabenstein | ..... | H04L 9/3255 |
| 2019/0273617 A1* | 9/2019 | Maher | .................... | H04L 9/085 |

OTHER PUBLICATIONS

Cambou et al., "PUF designed with Resistive RAM and Ternary States", CISRC '16: Proceedings of the 11th Annual Cyber and Information Security Research Conference, Apr. 2016, Article No. 1, pp. 1-8, https://doi.org/10.1145/2897795.2897808.

Cambou et al., "Physically Unclonable Functions with multi-states and Machine Learning", Conference: 14th International Workshop on Cryptographic Architectures Embedded in Logic Devices (CryptArchi), France, 2016, 1 page, https://www.researchgate.net/publication/303187893_Physically_Unclonable_Functions_with_multi-states_and_Machine_Learning.

Korenda, "A Secret Key Generation Scheme for Internet of Things using Ternary-States ReRAM-based Physical Unclonable Functions", Cornell University, May 17, 2018, 6 pages, International Wireless Communications and Mobile Computing Conference, 2018, arXiv:1805.06980.

Yamamoto et al., "Uniqueness Enhancement of PUF Responses Based on the Locations of Random Outputting RS Latches", Cryptographic Hardware and Embedded Systems—CHES 2011, Lecture Notes in Computer Science, vol. 6917, 17 pages, Springer, Berlin, Heidelberg, https://doi.org/10.1007/978-3-642-23951-9_26.

* cited by examiner

SECURE DIGITAL SIGNATURES USING PHYSICAL UNCLONABLE FUNCTION DEVICES WITH REDUCED ERROR RATES

CROSS-REFERENCE TO RELATED APPLICATIONS

The present application claims priority to U.S. Provisional Application 62/727,186 entitled "Digital Signature for Blockchains with Ternary Physically Unclonable Functions (PUFs)" and filed on Sep. 5, 2018.

STATEMENT REGARDING FEDERAL SPONSORED RESEARCH

This invention was made with Government support under grant no. FA8750-19-1-0024 awarded by the Air Force Research Laboratory. The Government has certain rights in the invention.

BACKGROUND OF THE INVENTION

Conventional blockchain and other distributed-ledger-based cryptographic systems secure ledgers against alteration by appending a hash of the previous state of the ledger to each new transaction block. The ledger history and transactions are made resistant to alteration by use of cryptographic signing techniques. The hash of the previous ledger state is encrypted by a device originating a new transaction block using a private key associated with that device. The encrypted hash is included in the new transaction block as a digital signature which may be read by decrypting it using a public key corresponding to the private key included in the transaction block or otherwise made publicly available to other devices. If the decrypted signature matches the unencrypted hash of the previous ledger state, it can be assumed that the new transaction block is valid and has not been altered by another party.

BRIEF SUMMARY

In an example embodiment, a method comprises performing an enrollment procedure. Performing the enrollment procedure includes issuing a set of enrollment challenges to a client possessing a physical-unclonable-function ("PUF") array having a plurality of PUF devices. Performing the enrollment procedure further includes receiving and storing respective enrollment responses to each of the enrollment challenges generated by the client in a database by measuring physical characteristics of PUF devices belonging to portions of the PUF array specified by each enrollment challenge.

The method further comprises selecting, as an authentication challenge, a first enrollment challenge of the set of enrollment challenges; and issuing the authentication challenge to the client. The method further comprises generating a cryptographic public key. The cryptographic public key is generated by determining an expected response to the authentication challenge and determining the cryptographic public key by using the expected response as a private key input to a first asymmetric public key generator ("APKG"). The expected response to the authentication challenge is determined by retrieving the respective enrollment response corresponding to the first enrollment challenge from the database.

The method further comprises receiving a cryptographic public key generated by the client using a client-generated authentication response to the authentication challenge as a private key input to a second asymmetric public key generator (APKG) associated with the client. The method further comprises publishing the received public key in a ledger of authenticated public keys in response to determining that the authentication response is consistent with the expected response.

In another example embodiment, a system comprises a processor, an asymmetric public key generator (APKG), and memory coupled to the processor. The memory stores sets of enrollment challenges and respective sets of enrollment responses to the enrollment challenges. The enrollment responses are obtained from a plurality of client devices. Each of the plurality of client devices has a respective physical-unclonable-function ("PUF") array having pluralities of PUF devices. Each enrollment challenge response is derived from measurements of physical characteristics of PUF devices belonging to the PUF arrays of associated client device.

The memory also stores executable instructions that, when executed by the processor cause the processor to select, as an authentication challenge, a first enrollment challenge belonging to one set of enrollment challenges; issue the authentication challenge to a client device; and generate a cryptographic public key. The cryptographic public key is generated by determining an expected response to the authentication challenge; and determining the cryptographic public key using the expected response as a private key input to the APKG. The instructions, when executed, also cause the processor to receive a public key generated by the client device using a client-generated authentication response to the authentication challenge as a private-key input to another APKG associated with the client device; and publish the received public key in a ledger of authenticated public keys in response to determining that the authentication response is consistent with the expected response.

In another example embodiment a system comprises a processor, a physical-unclonable-function ("PUF") array of PUF devices an asymmetric public key generator (APKG), and memory coupled to the processor. The memory stores instructions that, upon execution by the processor, cause the processor to transmit an authentication request to a server having another APKG and receive an authentication challenge from the server in response to the authentication request; measure physical characteristics of a PUF devices forming a portion of the PUF array specified by the authentication challenge; generate an authentication response based on the measured physical characteristics and transmit the authentication response to the server; generate a cryptographic public key by providing the authentication response to the APKG as a private key; and create a digitally-signed transaction record including a message encrypted with the private key, the transaction record including the public key.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

FIG. 1 depicts an enrollment procedure wherein a server issues challenges to clients having PUF arrays and stores responses to those challenges for use in subsequent authentication of the clients, according to one embodiment.

DETAILED DESCRIPTION

Figure 1:
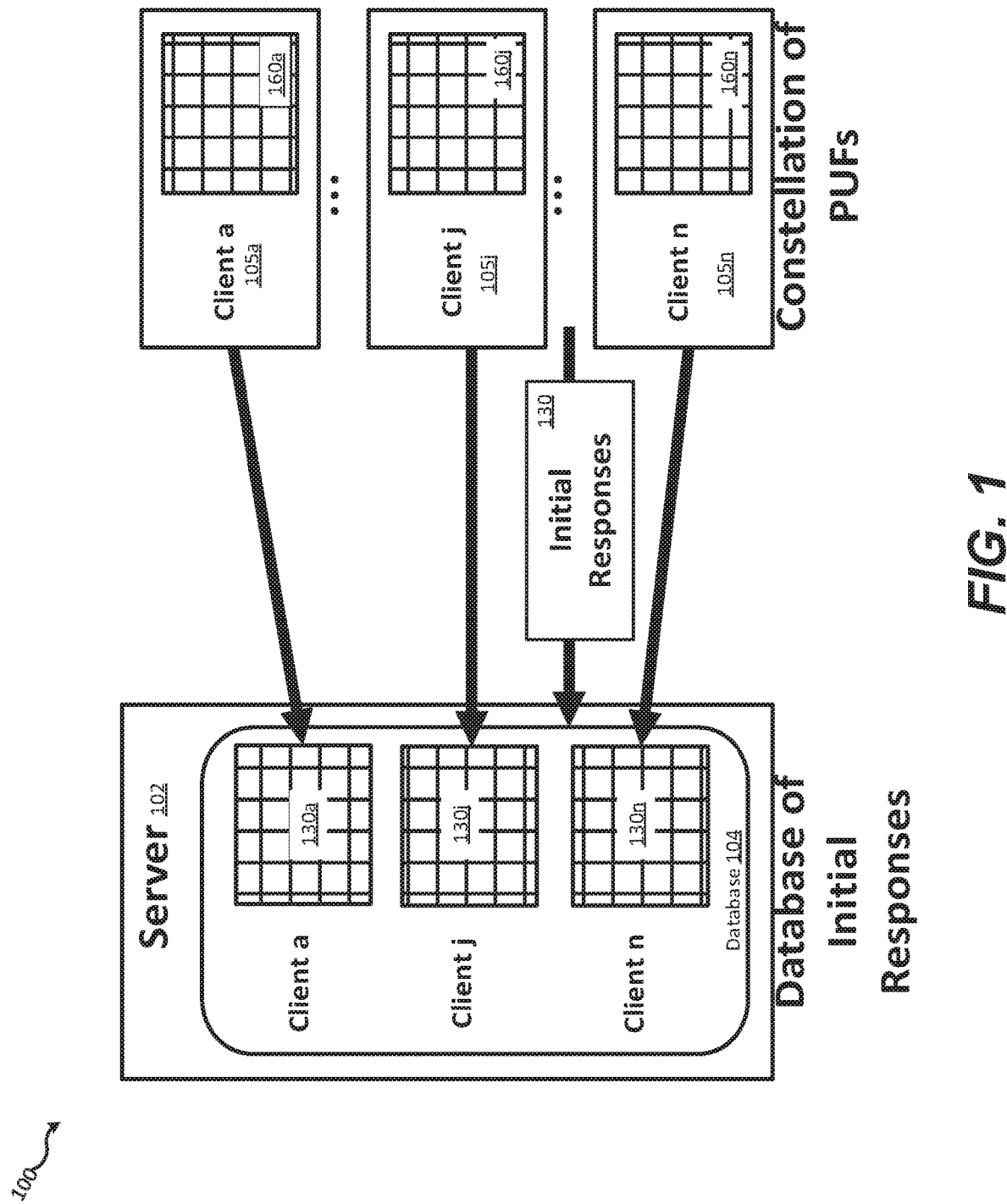

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

It should be understood that, although the present disclosure may refer to "blocks," "blockchains," "blockchain transactions," and similar terms, the disclosures herein may be applied to other applications where it is desirable to provide authenticated public keys associated with persons or devices. Thus, references to particular applications are intended as non-limiting examples provided for the purpose of greater ease of understanding.

Conventional blockchain-based transaction ledgers and related systems and methods have disadvantages. For example, although conventional blockchain transactions may be secured against alteration by the use of cryptographic signing of blocks, they do not allow secure identification and authentication of the users and devices originating transactions. In addition, the private keys used by users or devices to sign blocks may become compromised, risking the insertion of malicious transactions by an attacker.

Accordingly, embodiments disclosed herein address these and other shortcomings by using physical unclonable function (PUF) generators (APGs) to enable authentication of client devices and the use of one-time private/public key pairs to sign transactions without requiring thee client devices and one or more servers to exchange information which might compromise the security of the private keys over insecure networks. Various systems and methods for improving the reliability APGs are disclosed.

In the context of this disclosure, a challenge is any information transmitted to an APG to cause production of an expected response (referred to as a "challenge response") corresponding to that information. Challenge responses may be generated by accessing devices (or ranges of devices) in an array of PUF devices belonging to the APG. Along these lines, a challenge may be input supplied to an APG which is used to produce a response having one or more expected values which depend upon characteristics' of the PUF array belonging to the APG to which the challenge is issued. The appropriate challenge response may be derived from those characteristics using instructions stored by the APG or other processing circuitry, received by the APG or other processing circuitry and/or additional information supplied to the APG or other processing circuitry (such as a password of a user). In one simple non-limiting example, a challenge might simply be returning the values stored by devices of a PUF array at a specified address or range of addresses. In other non-limiting examples, a challenge might include instructions to perform a mathematical, logical, or other operation(s) on those values.

Non-limiting examples of measurable physical characteristics of devices used in PUF arrays are time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., "0" or "1") after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the "0" or "1" state could be used as a characteristic of that device. Other non-limiting examples of suitable characteristics include optical measurements. For instance, a PUF device may be an optical PUF device which, when illuminated by a light source such as a laser, produces a unique image. This image may be digitized and the pixels may be used as an addressable PUF array A good PUF should be predictable, and subsequent responses to the same challenge should be similar to each other (and preferably identical). The quantification of the quality of the PUF is given by the Hamming distances between initial responses and subsequent responses, also defined as the challenge-response pair (CRP) error rate.

According to various embodiments, a PUF-enabled digital signature protocol includes the following stages: (1) Enrollment, (2) Handshaking, (3) Key Generation, (4)

Blockchain Signing, and (5) Ledger Maintenance. These stages are described below, beginning with reference to FIG. 1 illustrating an example environment 100 in which embodiments disclosed herein may be practiced. The environment 100 includes a server 102 and client devices, hereinafter clients 105 (represented by clients 105a, 105j, and 105n). The sever 102 manages a database 104 which may be stored in memory of the server 102. The database 104 stores a set of initial challenge responses 130, which may be generated in response to challenges issued by the server 102 to the clients 105, each of which may respond to the challenges by accessing a respective PUF array 160 represented by the PUF arrays 160a, 160j, and 160n belonging to clients 105a, 105j, and 105n. Alternatively, the server 102 may be otherwise provided with information suitable to generate the initial challenge responses 130.

A PUF array 160 may form parts of an addressable PUF generator (APG), described further below, which may contain additional processing circuitry and execute instructions for generating challenge responses. Enrollment is performed for each client 105 in a secure environment. After enrollment, the constellation of clients 105 may operate in an insecure environment and communicate with each other over public networks. Secure information needs to be encrypted.

Figure 2A:
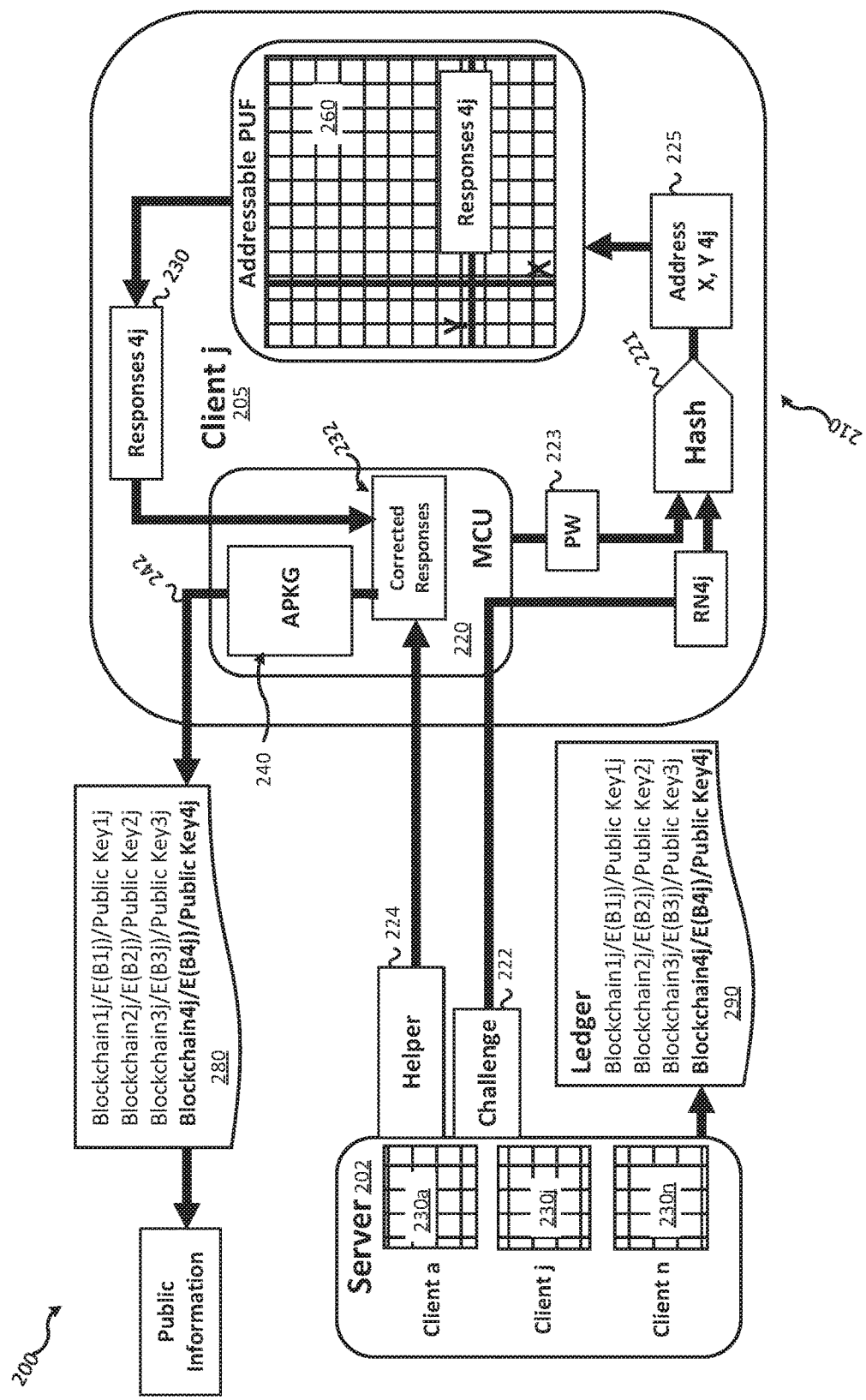
FIG. 2A is a block diagram of a client device with an addressable PUF generator (APG), interacting with a server according to one embodiment.

FIG. 2A illustrates a simplified example embodiment 200 of an addressable PUF generator (APG 210) belonging to a client 205, interacting with a server 202 according to embodiments disclosed herein. The APG 210 includes a PUF array 260 and a microcontroller 220. The PUF array 260 is an array of electronic or other devices with measurable physical characteristics, configured in an addressable array similar to an addressable memory device such as RAM or ROM chip. Due to small variations which occur during semiconductor manufacturing or other manufacturing processes, each PUF device (and hence each PUF array 260) may be unique, even if the PUF arrays are mass-produced by a process designed to produce nominally identical devices. The PUF array 210 (shown here as a 2D-array of cells) can be accessed using a controller 220 which receives challenges 222 (originating in this example from the server 202). The APG 210 responds by to challenges 222 by generating responses 230 using measured characteristics of one or more PUF devices within the PUF array 260 identified by the address 225 (which may also identify a range of addresses).

As shown in FIG. 2A, each client 205 (represented by "Client j" shown) has an APG 210 containing a PUF array 260 that is unique to that client 205. The APG 210 may be used to generate numerous responses 230 unique to that client 205. These responses 230 cannot be replicated by an attacker without physical access to the PUF array 260. During the Enrollment stage, the server 202 may obtain the initial responses 230 for each client 205 by generating all possible challenges 222 and storing responses 230 to those challenges 222 generated by each APG 210 in a database 204. Alternatively, the server 202 may be otherwise supplied with characteristics of each PUF array 260 sufficient to generate the expected responses 230. The microcontroller 220 may include instructions to combine information from the challenge 222 with additional information (such as a user password 223) and pass the combination through a hash function 221 the result to produce the address 225 (or range of addresses) within the PUF array 260 to measure in order to generate the proper response 230.

After the clients 205 are enrolled with the server 202, embodiments disclosed herein may be utilized to generate private/public key pairs to sign transactions. First, the sever 202 and a client 205 (such as "Client j" shown in FIG. 2A) enter the Handshaking stage. In the Handshaking stage an objective is for the server 202 to transmit the information needed to identify a particular portion of the PUF array 260 of the client 205. Both the server 202 and the client 205 can independently produce a response to the challenge: the server can lookup information about the PUF array 260 obtained during enrollment (or otherwise supplied to the server 202) and the client 205 can retrieve the same information by using the APG 210 to access the PUF array 260.

During Handshaking, the server 202 issues a challenge 222 to the APG 210 of the client 205. This challenge 222 is used by the APG 210 to identify the portion of the devices belonging to the PUF array 260 to access. This challenge 222 may be a random number. In some embodiments, the server 202 and the client 205 may have access to the same random number generator or may have synchronized random number generators. In such embodiments, the server 202 does not need to transmit the challenge 222 to the client 205 in order for the client 205 to generate the challenge response 230 using the APG 210.

As shown in FIG. 2A, the ability to generate the challenge response 230 may be protected by a password 223. In such embodiments, the address 225 specifying which device(s) in the PUF array 260 to access is produced by inputting the challenge 222 combined with the password 223 to a hashing function 221. As an example, if the PUF array 260 is represented as a two-dimensional array containing 256 rows and 256 columns, 8 bits of the message digest can be used to find the first coordinate X in the PUF array 260; the following 8 bits can be used to find the second coordinate Y.

As discussed above, the measurement of characteristics of individual PUF devices may not be perfectly deterministic. As part of the Handshaking process, the server 202 may send additional information to the client 205 for use in making generation of the challenge response 230 more reliable. The helper instructions 224 may include a checksum or other error-correcting information for use with error-correcting codes, or other information or instructions used in response generation schemes to be discussed later below. Upon receiving the challenge response 230, the microcontroller may use the helper instructions 224 to generate corrected responses 232. Use of the helper instructions 224 and other methods of improving the reliability of the APG 210 will be discussed further below.

The server 202 can authenticate a client 205 by issuing the challenge 222 to the client 205 and then comparing the corrected challenge response 232 generated by APG 210 with the initial response to that challenge stored by the server 202 for that client 205 (e.g., initial challenge responses 230) or determine that the corrected challenge response 232 is consistent with the initial challenge response 230 by comparing information derived from the corrected challenge responses 232 with information derived similarly by the server 202 from one of the initial challenge responses 230 corresponding to the challenge 232 issued by the server. The server 202 may require that the corrected response 232 is identical to the expected response to the challenge 222 (i.e., the initial response 230 corresponding to the challenge 222) in order to authenticate the client 205. Alternatively, the server 202 may accept a corrected response 232 with a Hamming distance less than a predetermined maximum distance from the expected response as evidence that the challenge response 230 is consistent with the expected response.

In some embodiments, the server 202 may use information derived from the corrected challenge response 232 for authentication rather than the corrected challenge response 232 itself such as a cryptographic key derived from the corrected challenge response 232. In such embodiments, if the Hamming distance between the corrected challenge response 232 and the expected response is greater than the predetermined distance, the server 202 may issue the client 205 a new challenge 222 and authenticate the client based on the corrected challenge response 232 to the new challenge 222.

After an APG 210 generates the corrected responses 232, the corrected responses 232 are used as a private-key input to an asymmetric public key generator (APKG 240) which produces a cryptographic public key 242 as an output. The corrected responses 232 may then be used as a cryptographic private key which the client 205 may use to cryptographically sign a transaction record added to the blockchain 280 or other data. The APKG 240 may implement any acceptable asymmetric key generation algorithm for producing public keys from a private key according to any chosen asymmetric cryptography scheme. Non-limiting examples of such schemes include elliptical curve cryptography (ECC), RSA, Elliptic Curve Diffie-Hellman Key Exchange (ECDHKE), DSA and related technologies such as ElGamal encryption, the Schnorr signature algorithm, hash-based DSA, lattice-based DSA, and so on. In some embodiments, the server 202 may instruct a client 205 not to cryptographically sign the blockchain 280 or other message unless the client 205 has been successfully authenticated by the server 202. In other embodiments, the server 202 may provide confirmation to a client 205 of successful authentication, indicating that the blockchain 280 or other message may be cryptographically signed by the client 205.

As noted above, it is desirable that the challenge-response pair (CRP) error rate of a given APG is low. For example, if the server 202 generates a cryptographic public key using one of the initial response 230 and a client 205 attempts to generate the same cryptographic public key from responding to an appropriate challenge 222, the process will fail if the challenge response 230 differs from the expected response by even a single bit. However, typical PUF arrays may exhibit CRP errors at rates of approximately 3-10% due to temperature changes, noise sources, aging, or other parameter drifts. Thus it is important to improve CRP error rates or correct CRP errors. While conventional error correction methods may be employed, in some applications doing so may result in increased complexity and power consumption and may be impractical (e.g., in IoT and other low-power devices). Therefore, embodiments disclosed herein may employ various other schemes for reducing CRP error rates as disclosed herein.

In some embodiments, the cryptographic public key 242 generated by a client 205 may also be used by the server 202 to authenticate the client 205 rather than the corrected challenge responses 232, prior to use of the associated corrected challenge response 232 as a private key. In such embodiments, the server 202 generates an expected public key using the expected response to the challenge 222 and compares the expected public key to the public key received from the client 205. The server 202 may require that the cryptographic public key 242 is identical to the expected public key (i.e., the result of generating a public key using the initial response 230 corresponding to the challenge 222 as the private key input to an APKG associated with the server 202) in order to authenticate the client 205.

Alternatively, in such embodiments, if the server-generated expected public key does not match the client-generated cryptographic public key 242, the server 202 may search the database 204 for other initial possible challenge responses 230 with Hamming distances less than a predetermined maximum distance from the expected response to the challenge 222. The server 202 may then generate additional public keys using those other responses. If one of the additional public keys matches the cryptographic public key 242, the client 205 may be authenticated. If none of the additional public keys matches the cryptographic public key the server 202 may issue the client 205 a new challenge 222 and authenticate the client based on a new cryptographic public key 242 derived from a new challenge response 232 to the new challenge 222.

This authentication scheme is referred to herein as "public-key matching." Public-key matching may be used to eliminate the need for error correction when used in conjunction with ternary PUF schemes described later below When used with such ternary PUF schemes, CRP error rates below the level of $10^{-8}$ may be realized. Furthermore, comparable CRP error rates can be achieved by combining binary PUF error-correction methods capable of achieving CRP rates on the order of $10^{-3}$ on their own with public-key matching.

Figure 2B:
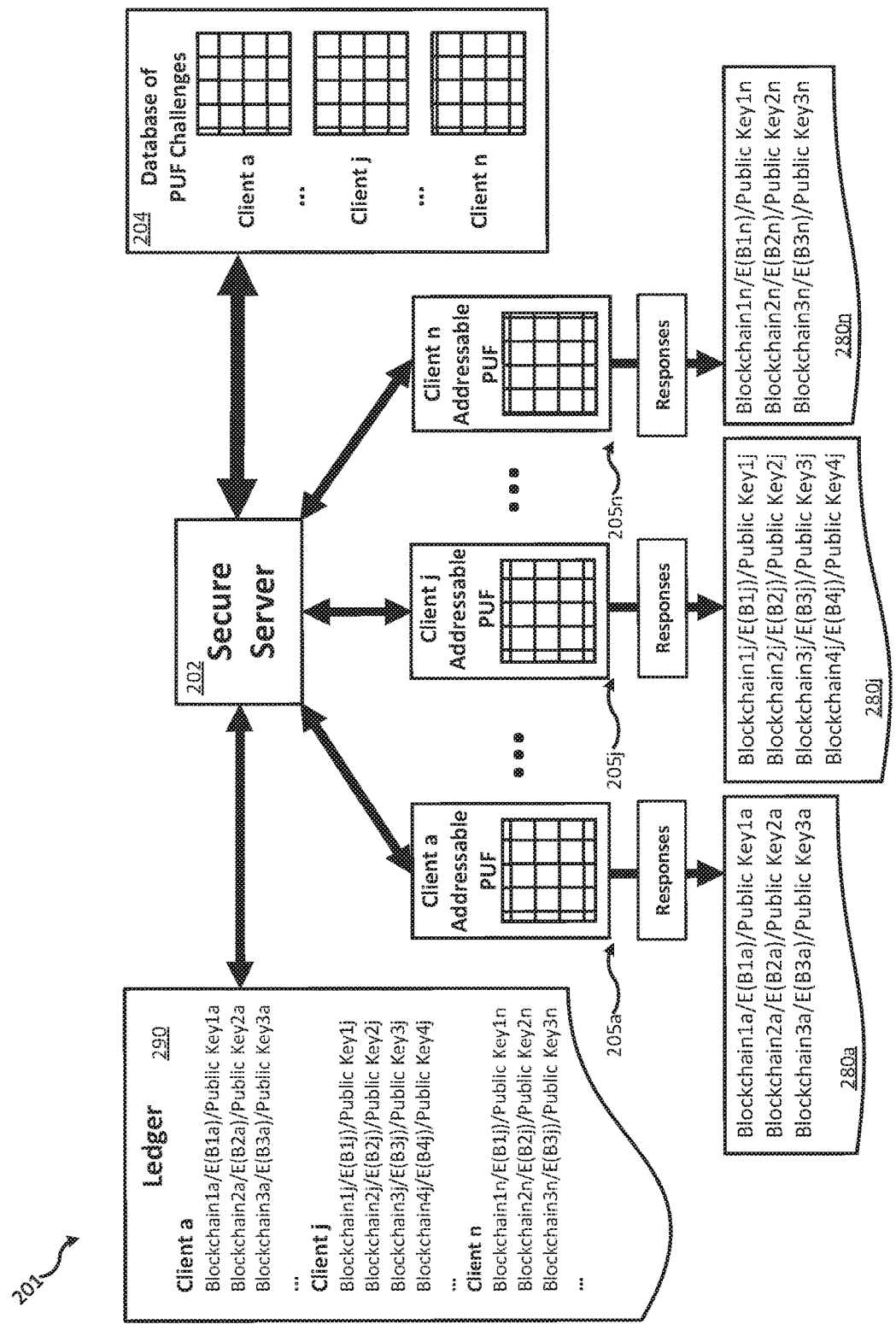
FIG. 2B depicts an overall architecture of a secure network, according to one embodiment.

FIG. 2B illustrates an example architecture 201, in which the server 202 acts as a certificate authority and may communicate with multiple clients 205 (such as the clients $\{205a, \ldots 205j, \ldots, 205n\}$ shown), issuing challenges 222 and authenticating the clients 205 based on their responses. The clients 205 sign associated blockchain blocks 280 (blocks $\{280a, \ldots, 280j, \ldots, 280n\}$, respectively). Each block contains a digest of previous blocks signed (encrypted) with a private key generated by the associated client 205 as well as a copy of the corresponding cryptographic public key 242, which may be used by anyone to verify (decrypt) the digest using the associate cryptographic public key 242. Because the server 202, acting as a certificate authority, may issue an arbitrarily large number of potential challenges 222, each individual block 280 signed by a given client 205 may be signed with a unique private/public key pair. The blocks 280 may be verified by contacting the server 202, in its role as a certificate authority, to verify public keys in the blocks 280. The use of effectively one-time private/public key pairs for each blockchain transaction may greatly enhance security. For example, there is no risk if a previously-used private key is compromised, because (a) the compromised private key is unlikely to be re-used and (b) a compromised private key is useless unless an attacker is able to intercept a challenge 222 and somehow determine that the appropriate challenge response 230 specifies the compromised private key without first gaining access to the APG 210 used to generate that private key.

In addition to authenticating the clients 205, the server maintains a ledger of the cryptographic public keys 242 used by each client 205 to sign the blockchain(s) 280. The embodiments disclosed herein may be applied equally to applications with a single centralized blockchain, distributed P2P architectures, and other systems where the each client may maintain one or more blockchains unique to that client. The server 202 tracks the public keys 242 used by each client 205 after being authenticated by the server 202 as described above. The server 202 maintains a ledger 290 containing all public keys 242 used by authenticated clients 205 and makes the ledger 290 available to other clients 205 or other parties who wish to verify signed transactions.

Figure 3:
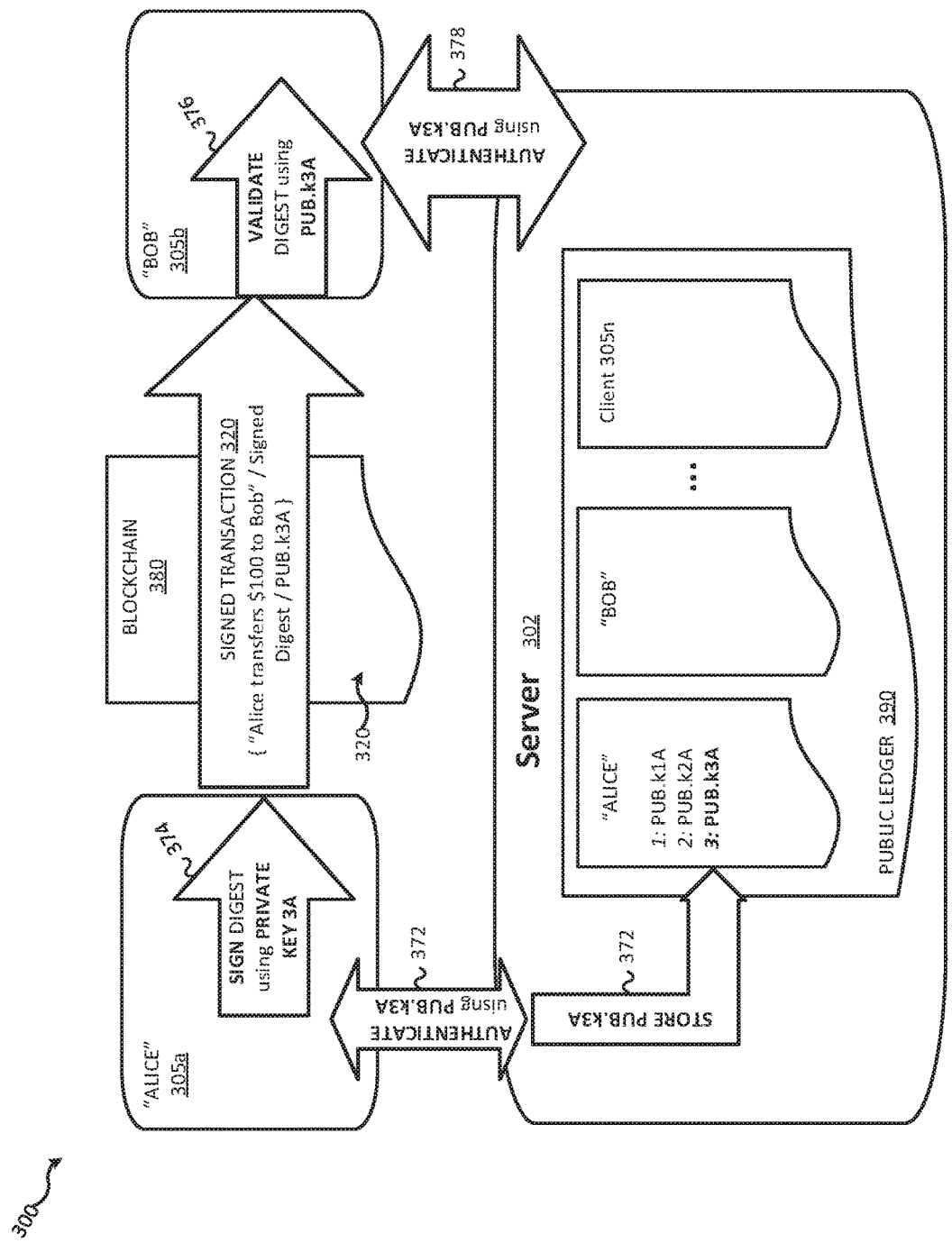
FIG. 3 depicts a simplified transaction process that may be practiced within the architecture of FIG. 2B.

FIG. 3 illustrates a simplified example process 300 of adding a new transaction to a blockchain 380 in the context of the architecture 200 illustrated in FIG. 2B. The process 300 includes the steps 372, 374, 376, and 378. In process 300, as depicted in FIG. 3, client 305a ("Alice") adds a transaction 320 transferring $100 to client 305b ("Bob") via the blockchain 380. Before generating and signing the transaction 320 (i.e., a transaction block), Alice contacts the server 302 to initiate the process and receives a challenge similar to the challenge 222 of FIG. 2A from the server 302 (not shown). As described above in connection with FIG. 2, the client 305a (Alice) generates a public key PUB.k3A using a response to the challenge.

The process 300 begins at step 372 after the public key PUB.3kA has been generated. At step 372, Alice transmits the public key PUB.3kA to the server 302 and is authenticated by the server 302. The server 302 stores the public key PUB.3kA in the public ledger 390 and associates the public key PUB.3kA with Alice in the ledger 390, along with public keys previously used by Alice (public keys PUB.1kA and PUB.2kA). The ledger 390 may also store keys for other clients 305 such as Bob (client 305b) and others through client 305n.

At step 374, Alice generates the transaction 320 and cryptographically signs it using a private key used to generate the public key PUB.k3A using methods similar to those described previously in connection with FIGS. 2A and 2B. The transaction 320 includes information effectuating the transfer of $100 to Bob as indicated by the plaintext gloss depicted in the FIG. 3. The transaction also includes a digest of the previous state of the blockchain 380 encrypted using the aforementioned private key which may be decrypted using the corresponding public key PUB.k3A. The transaction 320 may further include the public key PUB.k3A.

At step 376, Bob receives the transaction 320 from Alice (or obtains it from the blockchain 380) and validates the transaction 320 to ensure that it represents a valid block. Bob validates the block by using the public key PUB.k3A associated with the transaction 320 to decrypt the encrypted digest of the previous state of the blockchain 380 (e.g., a hash of the blockchain 380 prior to insertion of the transaction 320) and confirming that the decrypted digest agrees with the previous state of the blockchain 380 or an unencrypted hash thereof included in the transaction 320

At step 378, enabled by the methods disclosed herein, Bob can confirm that not only is the transaction 320 valid, but that it also originates from Alice, an authentic user. Bob does this by determining that the public key PUB.k3A used to sign the transaction 320 is an authentic public key associated with Alice as stored in the ledger 390. In some embodiments, the ledger 390 also explicitly associates each such public key with a transaction. In such an embodiment, Bob may also further determine that the public key PUB.k3A is associated with the transaction 320 in the ledger 390.

Various embodiments may employ additional techniques to reduce CRP errors rates as alternatives or supplements to techniques disclosed above. One such technique is embodiment 400 depicted in FIG. 4 which is described below as a modification of the previously described enrollment scheme. In the enrollment scheme of embodiment 400, the server 402 issues each possible challenge repeatedly and tracks the statistical distribution of values included in the challenge responses 430 (represented by the challenge responses {430a, . . . , 430j, . . . , 430n} received from respective clients {405a, . . . , 405j, . . . , 405n}). The server 402 then assigns the elements of each challenge response 430 corresponding to individual PUF devices to one of three ternary states, which will be referred to using the ternary digits {−, x, +}. Measured device characteristics which fall within a first range of values are assigned the ternary value '−'. Measured device characteristics which fall within a second range of values exclusive of the first range are assigned the ternary value '+'. Measured device characteristics which fall within a third range of values exclusive of the first range and the second range are assigned the ternary value 'x'.

For example, if the PUF devices are SRAM cells, the measured device characteristics may be the frequency of the binary data states stored by the SRAM cells after power cycling. Cells which are always (or almost always) in the '0' state may be assigned to the '−' ternary state, while cells which always in the '1' state may be assigned to the '+' ternary state. Meanwhile, cells which are "unreliable" fluctuate between the '0' and '1' state may be assigned to the 'x' ternary state. The resulting ternary representations may be stored by the server 402 in the database 404 as initial challenge responses 430 for the clients 405. The server 402 may disregard values generated using unreliable cells when comparing challenge responses to expected challenge response. In some embodiments, the server 402 may send helper instructions (such as the helper instructions 224 shown in FIG. 2A, for example) to a client 405 which instructs that client 405 to exclude unreliable cells when responding to challenges and select additional cells to compensate. For example, if a challenge requires a 256-bit response the helper instructions may instruct the client 405 to select the first 256 devices which are not excluded from the challenge generation process started at a given address (e.g., the address 225 shown in FIG. 2A). The CRP rate can be significantly reduced using this approach when a sufficiently large number of initial responses 430 are gathered in response to each challenge.

Figure 4:
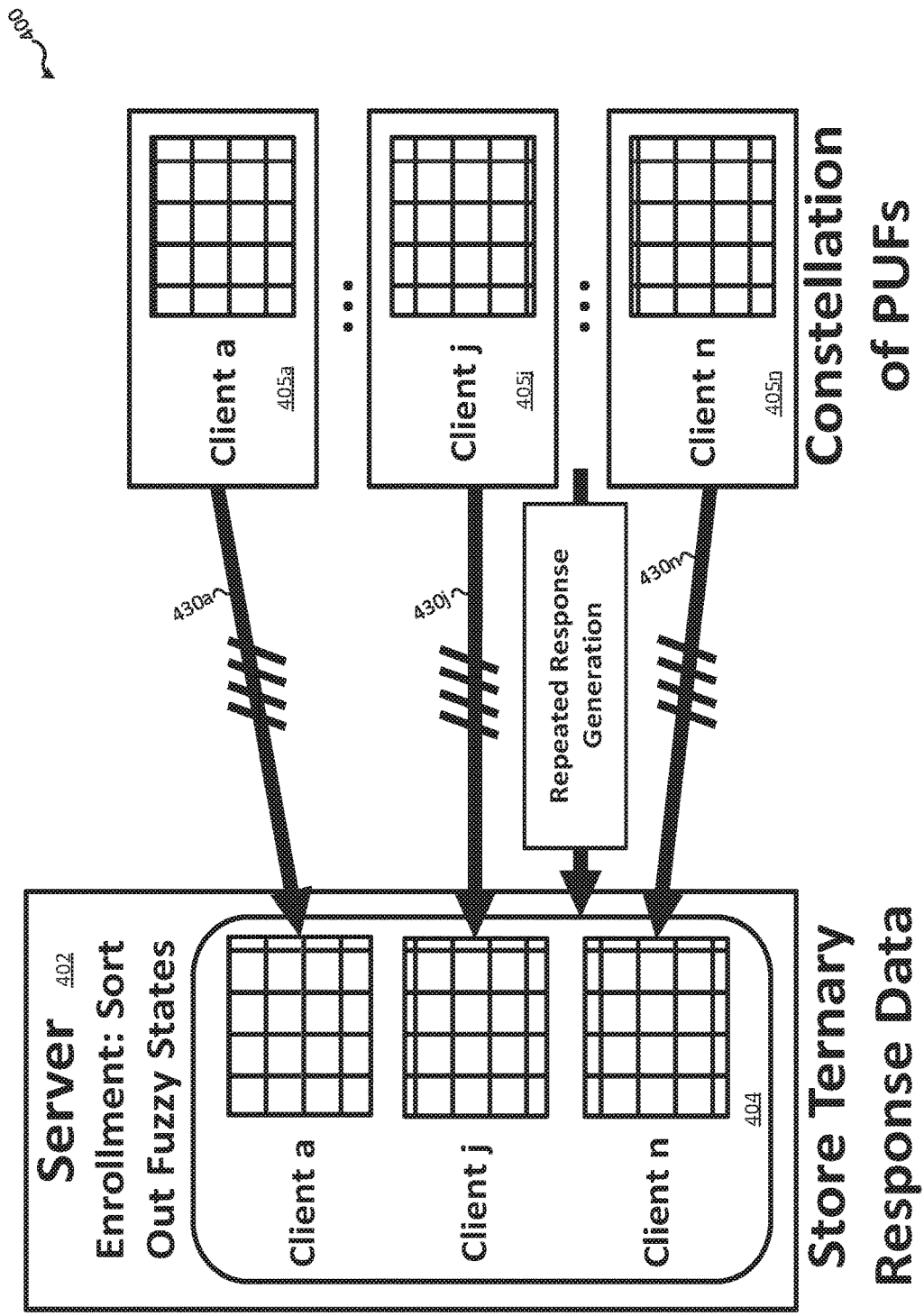
FIG. 4 depicts an enrollment procedure related to the enrollment procedure of FIG. 1 using ternary PUFs with multiple readings, according to one embodiment.

In some embodiments using the ternary enrollment scheme illustrated in FIG. 4, the server 402 shares the location of the unreliable cells with the clients 405 during the enrollment process, thereby reducing the size of the helper instructions (such as the helper instructions 224 of FIG. 2A) required during subsequent authentication and generation of challenge responses 430 by the clients 405 since the clients 405 are able to store the information necessary to exclude the unreliable cells from the challenge generation process.

Figure 5:
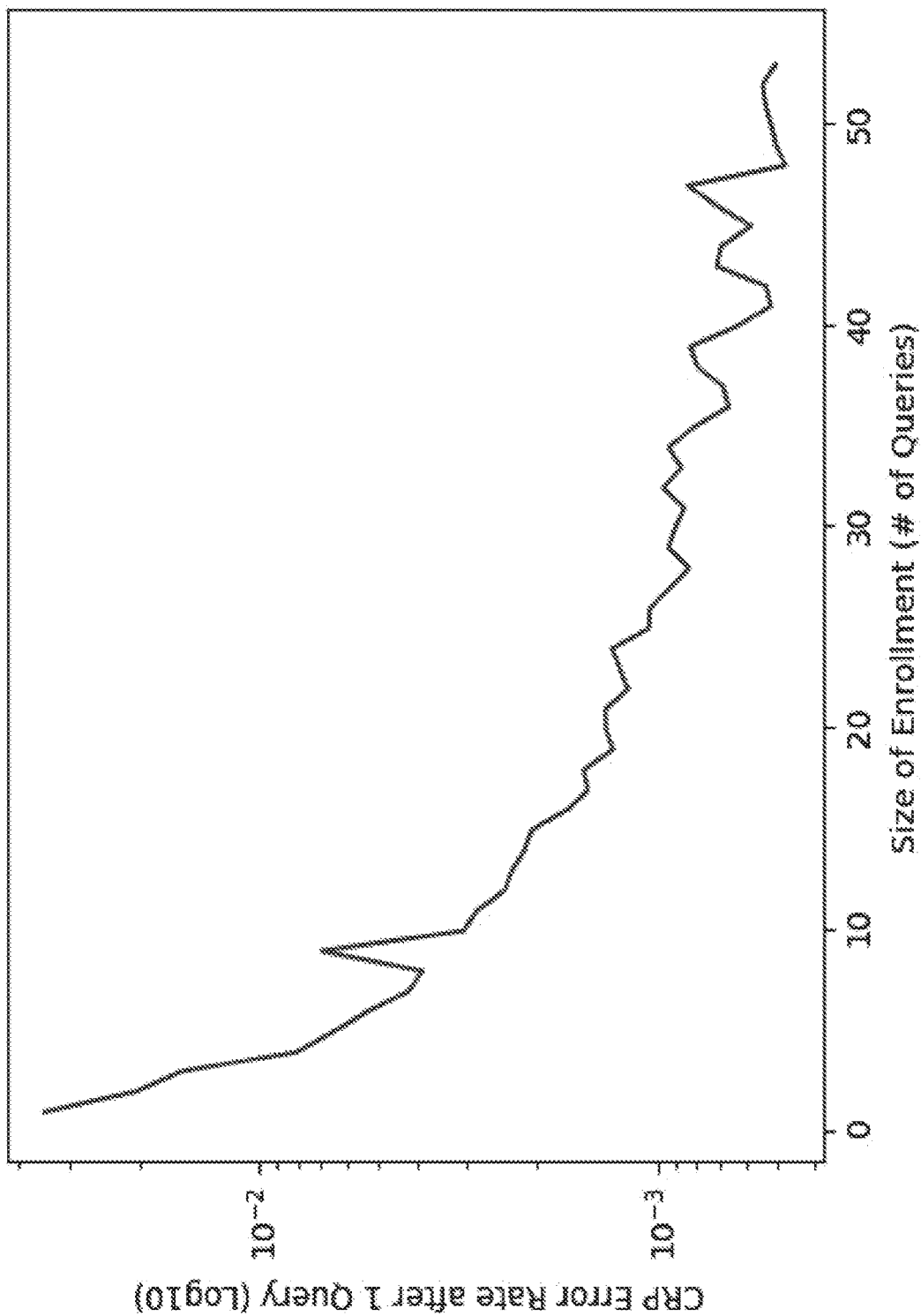
FIG. 5 shows the challenge-response pair (CRP) error rate of an SRAM-based PUF array when the enrollment procedure of FIG. 4 has been performed, according to one embodiment.

FIG. 5 is a graph shows the reduction in CRP achieved using the approach of FIG. 4 with up to fifty repetitions for each initial challenge responses 430 in which 10-40% of the devices are categorized as unreliable. The vertical axis indicates the error rate, and the horizontal axis indicates the number of repetitions during generation of each initial challenge response 430. The CRP error rate resulting from using the remaining cells has been measured in the range of $10^{-4}$, which is three orders of magnitude lower than rates typically observed with SRAM-based binary PUF arrays. In the case of Resistive RAM (ReRAM)-based PUF arrays, the CRP error rate using this approach has been measured in the range of $10^{-6}$.

Figure 6:
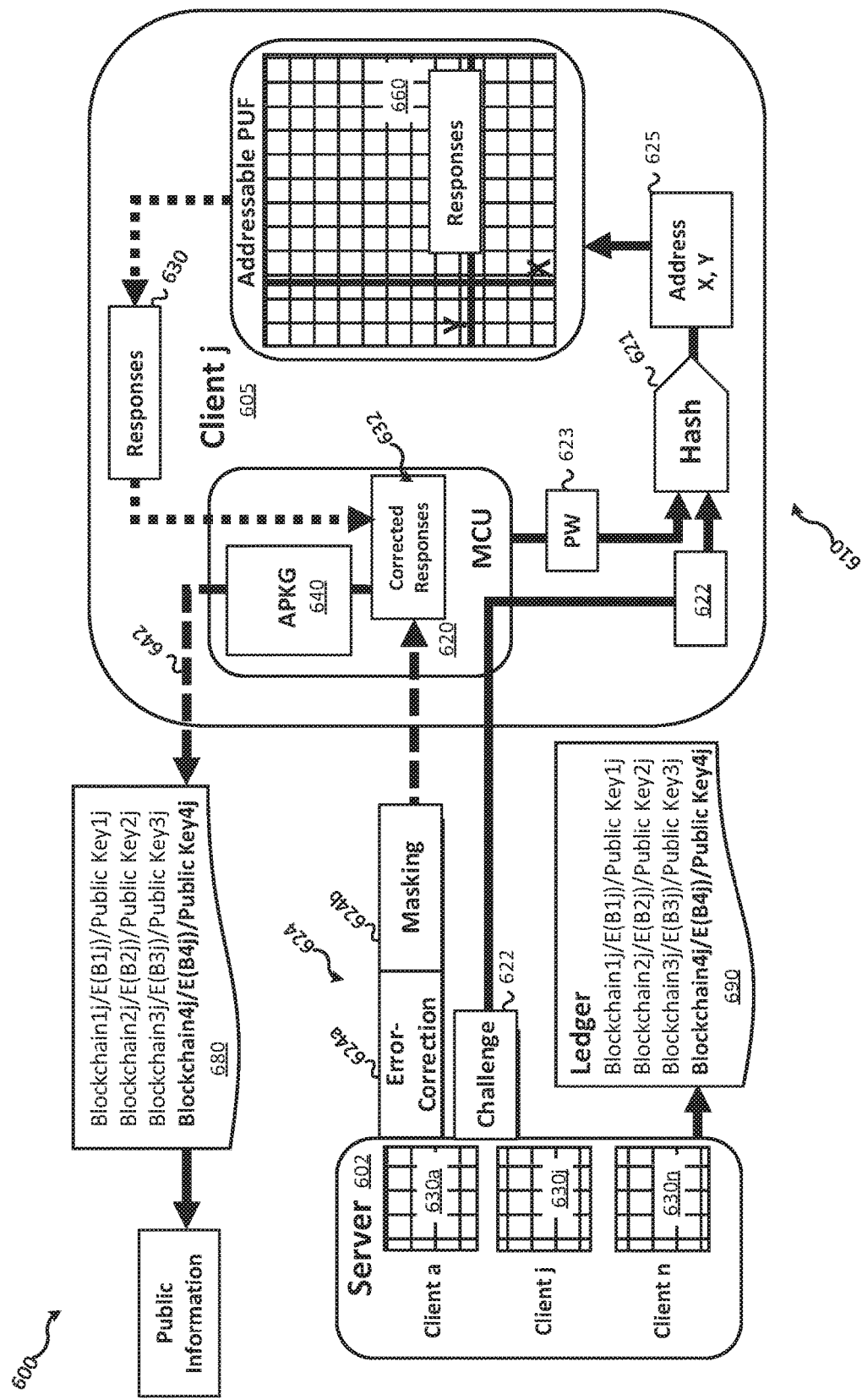
FIG. 6 is a block diagram of an APG for secure blockchain signing interacting with a server and using ternary PUFs and a masking procedure, according to one embodiment.

In some embodiments using ternary classification of PUF devices as described above, it may be impractical or otherwise undesirable for the clients 405 to store the locations of unreliable PUF devices. FIG. 6 illustrates one such embodiment. Similarly to the server 402 in embodiment 400 of FIG. 4, the server 602 stores initial challenge responses 630 (represented by the initial responses {630a, . . . , 630j, . . . , 630n} received from respective clients {605a, . . . , 605j, . . . , 605n}). The server 602 issues challenges 622 to the client 605 (represented by "Client j" shown) having an APG 610 with a microcontroller 620 and PUF array 660. The microcontroller receives the challenge 622 from the server 602 and hashes the challenge together with the password 623 using the hashing function 621 producing an address 625 specifying the portion of the PUF devices belonging to the PUF array 660 to measure in order to generate the challenge responses 630. The microcontroller 620 receives the challenge responses 630 and corrects them using the helper instructions 624 which include error-correction instructions 624a as well as masking instructions 624b. The error-correction instructions 624a function similarly to the helper instructions 224 of FIG. 2A. The masking instructions 624b instruct the APG 610 to exclude cells which the server 602 characterized as unrealizable cells during enrollment. The microcontroller may generate corrected responses 632 which simply exclude measurements of the unreliable cells. Alternatively the microcontroller 620 may measure additional cells to ensure that the corrected challenge responses 632 are of a specified length. The microcontroller 620 may store instructions for selecting the additional cells to measure, or may receive such instructions as part of the helper instructions 624. After the corrected responses 632 are generated they are used as a private key which in turn is used as the input to the APKG 640 which generates the corresponding cryptographic public key 642. The key pair may then be used to sign a transaction added to the blockchain 680 and the cryptographic public key 642 may be added to the ledger 690 by the server 602.

As disclosed above, using the masking instructions 624b as described eliminates the need for such instructions to be stored by the clients 605. This may be particularly advantageous because, in addition to reducing overhead for the clients 605, it may provide improved security. This is because storing information on the clients 605 identifying the unreliable cells could provide information for a side-channel attack. Thus, if the clients 605 do not use instructions received from the server 602 such as the masking instructions 624b to correct for unreliable cells, the required instructions would have to be stored in secure memory device to protect against such side-channel attacks, adding cost and complexity to the APGs 610.

With ternary PUF states as described above, the likelihood of failed authentication may be quite low. For example, if the CRP error rate of one PUF array cell is $10^{-4}$, the probability an APG generating a 256-bit-long response without error error-free is on the order of 90%. If the error rate is $10^{-6}$, the probability is greater than 99%.

Figure 7:
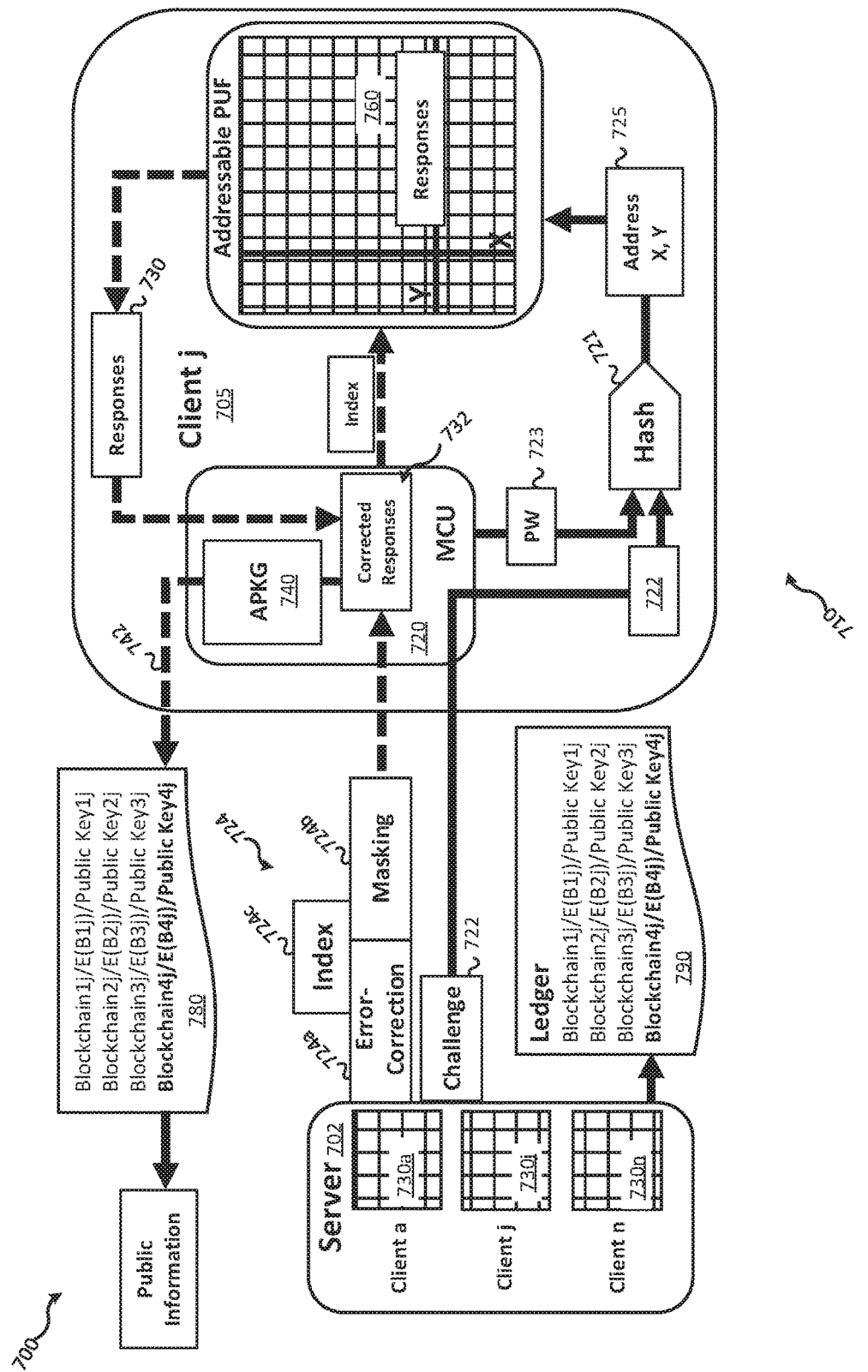
FIG. 7 is a block diagram of an APG for secure blockchain signing using ternary PUFs, the masking procedure of FIG. 6 and an additional procedure for selecting between multiple sets of challenge response generation instructions, according to one embodiment.

Embodiments disclosed herein may be augmented for even greater security, as illustrated by example embodiment 700 of FIG. 7 which extends the functionality of embodiment 600. In embodiment 700, the microcontroller 720 of the APG 710 stores a plurality of sets of instructions for generating challenge responses 730 to challenges 722. As a simplified non-limiting example using an SRAM-based PUF, one set of instructions may cause the APG 710 to use the binary data stored in SRAM cells of the PUF array 760 specified by the address 725 to generate the challenge responses 730. Meanwhile, another set of instructions also stored by the microcontroller 720 may cause the APG 710 to instead use the binary inverse of the current binary data stored in the SRAM cells specified by the address 725. The various sets of instructions may include other mathematical and logical operations.

The server 702 transmits a challenge 722 to an APG 710 belonging to a client 705 (represented by "Client j" shown). The challenge 722 is combined with the password 723 and hashed using the hash function 721 to generate the address 725 used to determine the PUF devices of the PUF array 760 to use to generate the challenge responses 730. The server also transmits the helper instructions 724 to clients 705. The helper instructions 724 include error correction instructions 724a (which are used similarly to the helper instructions 224 of embodiment 200 and error-correction instructions 624a of embodiment 600) as well as masking instructions 724c (which are used similarly to the masking instructions 624b of embodiment 600). The helper instructions 724 further include an index instruction 724c. The index instruction 724b is used by the microcontroller 720 to identify the correct set of challenge-generation instructions to use to generate the challenge instructions 730. The challenge responses 730 are modified using the masking instructions 724b to produce the corrected responses 732, similarly to the masking instructions of 624b of embodiment 600 are used to produce the corrected responses 632.

After the corrected responses 732 are generated they are used as a private key which in turn is used as the input to the APKG 740 which generates the corresponding cryptographic public key 742. The key pair may then be used to sign a transaction added to the blockchain 680 and the cryptographic public key 742 may be added to the ledger 790 by the server 702.

It should be understood that, unless explicitly stated or otherwise required, the features disclosed in embodiments explicitly described herein and elsewhere in this disclosure may be used in any suitable combinations. Thus, as a non-limiting example, any embodiment disclosed herein may use the public-key matching techniques disclosed herein or omit said techniques, as dictated by the needs of a particular application. Similarly, any embodiment may use or omit use of the index instructions disclosed herein, and so on.

The invention claimed is:

1. A method, comprising:
performing an enrollment procedure including:
issuing a set of enrollment challenges to a client possessing a physical-unclonable-function ("PUF") array having a plurality of PUF devices;
receiving and storing respective enrollment responses to each of the enrollment challenges generated by the client in a database by measuring physical characteristics of PUF devices belonging to portions of the PUF array specified by each enrollment challenge;
selecting, as an authentication challenge, a first enrollment challenge of the set of enrollment challenges; and
issuing the authentication challenge to the client;
generating a cryptographic public key by:
determining an expected response to the authentication challenge by retrieving the respective enrollment response corresponding to the first enrollment challenge from the database; and
determining the cryptographic public key by using the expected response as a private key input to a first asymmetric public key generator ("APKG"); and
receiving a cryptographic public key generated by the client using a client-generated authentication response to the authentication challenge as a private key input to a second asymmetric public key generator (APKG) associated with the client; and
comparing the generated cryptographic public key and the received cryptographic public key to determine whether the authentication response is consistent with the expected response, and if so, publishing the received public key in a ledger of authenticated public.

2. The method of claim 1, wherein the method further comprises authenticating a candidate public key associated with the client to another client by:

receiving a verification request containing the candidate public key from the other client;

comparing the candidate key with cryptographic public keys associated with the client and stored in the ledger; and transmitting a verification message to the other client indicating that the candidate public key is an authentic public key of the client in response to determining that the candidate public key matches a cryptographic key stored in the ledger and associated with the client.

3. The method of claim 1, wherein comparing the received cryptographic public key and the generated cryptographic public key to determine whether the authentication response is consistent with the expected response comprises determining that a Hamming distance between the received public key and the generated public key is less than a first predetermined maximum distance.

4. The method of claim 3, further comprising, when the Hamming distance between the received public key and the generated public key is at least one, determining that the received authentication response is consistent with the expected response by:

generating additional private keys having a Hamming distance less than a second predetermined maximum distance from the expected response and producing additional public keys corresponding to the additional private keys; and determining that one of the additional public keys is identical to the generated public key.

5. The method of claim 1, wherein issuing the transaction challenge to the client includes transmitting helper instructions to the client, the helper instructions including rules for generating the transaction-challenge response based on measurements of physical characteristics of PUF devices of a portion of the PUF array, the portion of the PUF array being specified by the transaction challenge.

6. The method of claim 1, wherein receiving the respective enrollment responses to each of the enrollment challenges includes receiving multiple responses from the client to each enrollment challenge generated by repeated measurements by the client of the PUF devices belonging to the portion of the PUF array specified by each challenge;

wherein performing the enrollment procedure further comprises:

receiving, as each challenge response, a set of signals representing physical characteristics of respective PUF devices belonging to portion of the PUF array specified by that challenge, as measured by the client; and recording, for each physical characteristic, a range of values for each signal; and wherein transmitting the helper instructions to the client includes transmitting rules instructing the client to generate the transactions challenge response by:

assigning a first ternary state to any measured physical characteristic having a value within a first range; and assigning a second ternary state to any measured physical characteristic having a value within a second range of values exclusive of the first range;

assigning a third ternary state to any measured physical characteristic having a value within a third range of values exclusive of the first and second ranges.

7. The method of claim 5, wherein receiving the respective enrollment responses to each of the enrollment challenges includes receiving multiple responses from the client to each enrollment challenge generated by repeated measurements by the client of the PUF devices belonging to the portion of the PUF array specified by each challenge;

wherein performing the enrollment procedure further comprises:

receiving, as each challenge response, a set of signals representing physical characteristics of respective PUF devices belonging to the PUF array specified by that challenge, as measured by the client; and recording, for each physical characteristic, a range of values for each signal and:

assigning a first ternary state to any measured physical characteristic having a value within a first range; and assigning a second ternary state to any measured physical characteristic having a value within a second range of values exclusive of the first range;

assigning a third ternary state to any measured physical characteristic having a value within a third range of values exclusive of the first and second ranges;

and wherein transmitting the helper instructions to the client includes transmitting masking instructions causing the client to exclude PUF devices having measured physical characteristics assigned to the third ternary state when generating the transaction response.

8. The method of claim 5, wherein transmitting the helper instructions to the client includes transmitting error-correction instructions that produce the expected response when executed upon an authentication response having a Hamming distance less than a predetermined maximum distance from the expected response by the client.

9. The method of claim 1, wherein the method further comprises transmitting an index instruction to the client together with the transaction challenge; and wherein the index instruction is configured to cause the client to:

select instructions indicated by the index instruction from a plurality of instructions stored by client, each of the plurality of instructions specifying distinct rules for generating challenge responses from measurements of physical characteristics of respective PUF devices belonging to the PUF array; and execute the selected instructions to generate the transaction challenge response.

10. A system, comprising:

a processor, an asymmetric public key generator (APKG), and memory coupled to the processor, the memory storing:

(a) sets of enrollment challenges and respective sets of enrollment responses to the enrollment challenges, the enrollment responses obtained from a plurality of client devices, each of the plurality of client devices having a respective physical-unclonable-function ("PUF") array having pluralities of PUF devices, each enrollment challenge response being derived from measurements of physical characteristics of PUF devices belonging to the PUF arrays of associated client devices; and (b) executable instructions that, when executed by the processor, cause the processor to:

select, as an authentication challenge, a first enrollment challenge belonging to one set of enrollment challenges; and issue the authentication challenge to a client device;

generate a cryptographic public key by:
  determining an expected response to the authentication challenge; and
  determining the cryptographic public key using the expected response as a private key input to the APKG;
receive a public key generated by the client device using a client-generated authentication response to the authentication challenge as a private-key input to another APKG associated with the client device; and
publish the received public key in a ledger of authenticated public keys in response to determining that the authentication response is consistent with the expected response.

11. The system of claim 10, wherein, when executing the instructions, the system is configured to authenticate a candidate public key associated with the client to another client, the instructions further causing the system to:
receive a verification request containing the candidate public key from the other client;
compare the candidate key with cryptographic public keys associated with the client and stored in the ledger; and
transmit a verification message to the other client indicating that the candidate public key is an authentic public key of the client in response to determining that the candidate public key matches a cryptographic key stored in the ledger and associated with the client.

12. The system of claim 10, wherein, when the system determines that the received authentication response is consistent with the expected response, the instructions cause the processor to determine that a Hamming distance between the received public key and the generated public key is less than a first predetermined maximum distance; and
  wherein, when the Hamming distance between the received public key and the generated public key is at least one, the instructions further cause the processor when determining that the received authentication response is consistent with the expected response, to:
    generate additional private keys having a Hamming distance less than a second predetermined maximum distance from the expected response and producing additional public keys corresponding to the additional private keys; and
    determine that one of the additional public keys is identical to the generated public key.

13. The system of claim 12, wherein when the processor receives the respective enrollment responses to each of the enrollment challenges, the instructions cause the processor to receive multiple respective responses from the client to each enrollment challenge generated by repeated measurements by the client of the devices belonging to the PUF array specified by each challenge;
  wherein when the processor performs the enrollment procedure, the instructions further cause the processor to:
    receive, as each challenge response, a set of signals representing physical characteristics of respective devices belonging to the PUF array specified by that challenge, as measured by the client; and
    record, for each physical characteristic, a range of values for each signal; and
  wherein, when the processor transmits the helper instructions to the client, the instructions further cause the processor to transmit rules instructing the client to generate the transactions challenge response by:
    assigning a first ternary state to any measured physical characteristic having a value within a first range; and
    assigning a second ternary state to any measured physical characteristic having a value within a second range of values exclusive of the first range;
    assigning a third ternary state to any measured physical characteristic having a value within a third range of values exclusive of the first and second ranges.

14. The system of claim 10, wherein the instructions further cause the processor to transmit an index instruction to the client together with the transaction challenge; and
  wherein the index instruction is configured to cause the client to:
    select instructions indicated by the index instruction from a plurality of instructions stored by client, each of the plurality of instructions specifying distinct rules for generating challenge responses from measurements of physical characteristics of respective devices belonging to the PUF array; and
    execute the selected instructions to generate the transaction challenge response.

15. A system, comprising:
a processor, a physical-unclonable-function ("PUF") array of PUF devices, an asymmetric public key generator (APKG), and memory coupled to the processor, the memory storing instructions that, upon execution by the processor, cause the processor to:
  transmit an authentication request to a server having another APKG and receive an authentication challenge from the server in response to the authentication request;
  measure physical characteristics of a PUF devices forming a portion of the PUF array specified by the authentication challenge;
  generate an authentication response based on the measured physical characteristics and transmit the authentication response to the server;
  generate a cryptographic public key by providing the authentication response to the APKG as a private key; and
  create a digitally-signed transaction record including a message encrypted with the private key, the transaction record including the public key.

16. The system of claim 15, wherein, when executing the instructions, the system is further configured to authenticate a candidate public key associated with another client, the instructions further causing the system to:
  transmit a verification request containing the candidate public key from the other client to the server; and
  receive a verification message indicating that the candidate public key is an authentic public key of the other client in response to determining that the candidate public key matches a cryptographic key stored by the server and associated with the other client.

17. The system of claim 16, wherein the instructions, when executed by the processor, further configure the processor to receive and execute helper instructions from the server, the helper instructions including rules for generating the authentication response using the measured physical characteristics of the PUF devices specified by the authentication challenge.

18. The system of claim 17, wherein the processor, when executing the helper instructions, is configured to generate the authentication response as a ternary response that:
  assigns a first ternary state to any measured physical characteristic having a value within a first range;

assigns a second ternary state to any measured physical characteristic having a value within a second range of values exclusive of the first range; and assigns a third ternary state to any measured physical characteristic having a value within a third range of values exclusive of the first and second ranges.

19. The system of claim 17, wherein the processor is further configured to receive error-correction instructions that produce the expected response when executed upon an authentication response having a Hamming distance less than a predetermined maximum distance from the expected response.

20. The system of claim 17, wherein the memory further stores a plurality of challenge instructions, each of the challenge instructions specifying distinct rules for generating challenge responses from measurements of physical characteristics of respective devices belonging to the PUF array; and wherein executing the index instruction causes the processor to:

select instructions indicated by the index instruction from the plurality of challenge instructions stored by client; and generate the authentication response according to the selected instructions.

\* \* \* \* \*